US006042956A

United States Patent [19]

Lenel

[11] Patent Number: 6,042,956

[45] Date of Patent: Mar. 28, 2000

[54] METHOD FOR THE SIMULTANEOUS GENERATION OF ELECTRICAL ENERGY AND HEAT FOR HEATING PURPOSES

[75] Inventor: Daniel Lenel, Bäretswil, Switzerland

[73] Assignee: Sulzer Innotec AG, Winterthur, Switzerland

[21] Appl. No.: 08/880,414

[22] Filed: Jun. 23, 1997

[30] Foreign Application Priority Data

Jul. 11, 1996 [EP] European Pat. Off. .............. 96810448

[51] Int. Cl.[7] .............................. H01M 8/04; H01M 8/22

[52] U.S. Cl. ................................................ 429/17; 429/26

[58] Field of Search ................................. 429/19, 26, 23, 429/24, 17

[56] References Cited

U.S. PATENT DOCUMENTS

| | | | |
|---|---|---|---|
| 3,146,131 | 8/1964 | Linden . | |
| 4,041,210 | 8/1977 | Van Dine | 429/16 |
| 4,128,700 | 12/1978 | Sederquist | 429/17 |
| 4,522,894 | 6/1985 | Hwang et al. | 429/17 |
| 4,532,192 | 7/1985 | Baker et al. | 429/19 |
| 4,683,177 | 7/1987 | Kinoshita . | |
| 5,264,300 | 11/1993 | Barp et al. | 429/30 |
| 5,401,589 | 3/1995 | Palmer et al. | 429/13 |

FOREIGN PATENT DOCUMENTS

| | | | |
|---|---|---|---|
| 0 486 911 A1 | 5/1992 | European Pat. Off. . | |
| 0 654 838 A1 | 5/1995 | European Pat. Off. . | |
| 44 46 841 A1 | 7/1996 | Germany . | |
| 9418712 | 8/1994 | WIPO | H01M 8/04 |
| WO 94/18712 | 8/1994 | WIPO . | |

OTHER PUBLICATIONS

Winkler, W. "Kraftwerke mit Brennstoffzellen als neuer Kraftwerkskomponente", in: VGB Kraftswerktechnik, vol. 75(6):509–515 (1995) Month N/A.

Extended Abstracts, vol. 87–02, Oct. 18, 1987, pp. 261–262, Krumpelt M., et al. "Systems Analysis for High–Temperature Fuel Cells".

General Chemistry, by Darrell Ebbing ,Houghton Mifflin Company, p. 216, 1996.

*Primary Examiner*—Maria Nuzzolillo
*Assistant Examiner*—J. O'Malley
*Attorney, Agent, or Firm*—Townsend and Townsend and Crew LLP

[57] ABSTRACT

A method for the simultaneous generation of electrical energy and heat for heating purposes uses a combustion gas consisting mainly of one or more hydrocarbons as well as a gas mixture containing oxygen. The method is carried out by means of at least one gas burner and at least one stack of fuel cells, with an oxygen surplus having a stoichiometric ratio greater than about 3 being provided in the battery. In the battery less than half of the combustion gas is converted for the generation of electricity while producing a first exhaust gas. The remainder of the combustion gas is burned in the burner while producing a second exhaust gas, and the first exhaust gas is used at least partially as an oxygen source for the combustion. Heat energy is won from the exhaust gases, with at least about half of the water contained in the exhaust gases being condensed out.

14 Claims, 3 Drawing Sheets

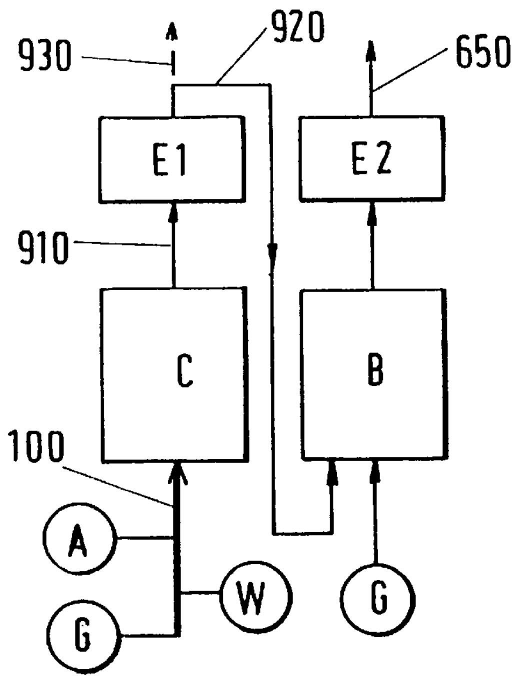
Fig.4
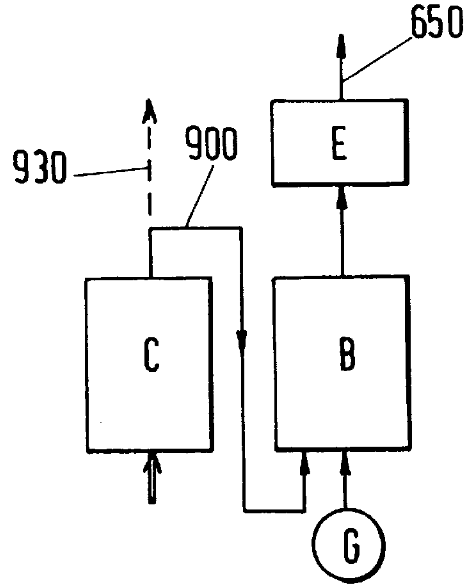
Fig.5
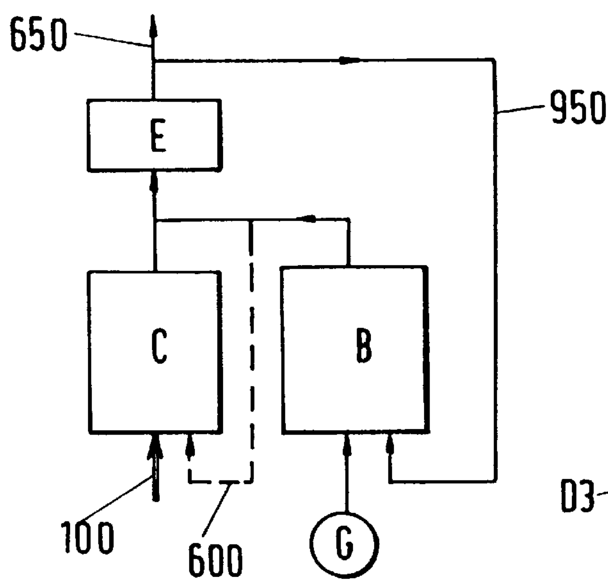
Fig.6
Fig.7
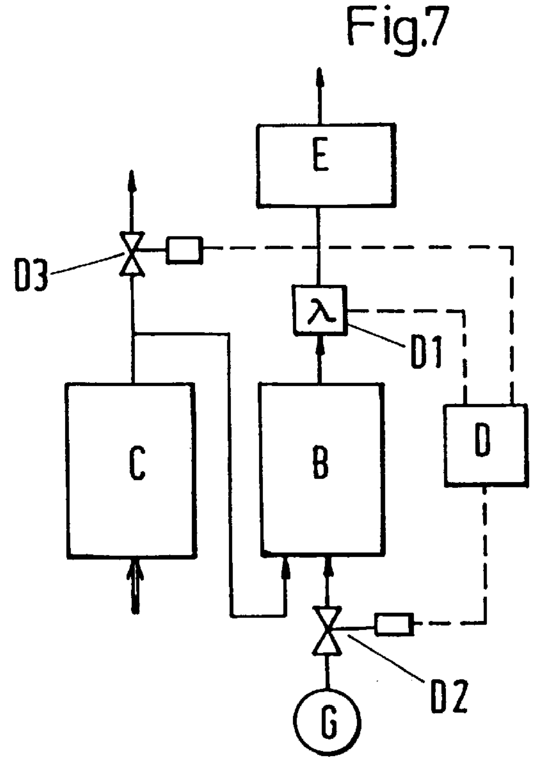

METHOD FOR THE SIMULTANEOUS GENERATION OF ELECTRICAL ENERGY AND HEAT FOR HEATING PURPOSES

BACKGROUND OF THE INVENTION

1. Field of the Invention

The invention relates to a method for the simultaneous generation of electrical energy and heat for heating purposes from a combustion gas, part of which is converted in a battery while the other part is burned in a burner as well as to a plant for carrying out the method.

2. Summary of the Prior Art

When using natural gas for heating purposes, in particular for heating rooms and/or utility water, the gas, which contains at least about 80% methane, is generally burned. Advantage is not taken here of the possibility of generating high quality energy, in particular electrical energy. It is however known that up to 50% of the chemical energy of methane can be converted to electrical energy by means of fuel cells. In high temperature cells the simultaneously arising heat to be dissipated can be economically used for heating purposes. Instead of natural gas, a combustion gas containing a hydrocarbon can also be used in which at least a portion of the gas consists of a hydrocarbon other than methane.

In many instances a supply of electrical energy which is largely constant throughout the entire year is desirable. If one intends simultaneously to generate electrical energy and heat for heating purposes by means of fuel cells, one is confronted in regions where heat is required for heating rooms only in the winter, i.e. in the cold season when substantial amounts of heat are required for heating the rooms, with the problem that large amounts of electrical energy can be generated during the winter, for the economical use of which it is difficult to find consumers. It is thus advantageous to combine the use of fuel cells with the use of conventional heating devices, in particular gas burners. During the warm season then the fuel cells can be operated alone; the heat given off can be used for heating the utility water.

SUMMARY OF THE INVENTION

The object of the invention is to provide a method for a combination of this kind, which comprises the use of fuel cells and gas burners, which makes available a large amount of heat for heating purposes especially during the winter, where the simultaneous generation of electricity by the fuel cells is to be carried out at the maximum possible power level.

The method for the simultaneous generation of electrical energy and heat for heating purposes uses a combustion gas consisting mainly of one or more hydrocarbons as well as a gas mixture containing oxygen. The method is carried out by means of at least one gas burner and at least one stack of fuel cells, with an oxygen surplus being provided in the battery at a stoichiometric ratio greater than about 3. Less than half of the combustion gas is converted in the battery for the generation of electricity while a first exhaust gas is produced. The remainder of the combustion gas is burned in the burner while producing a second exhaust gas, and the first exhaust gas used at least partly as an oxygen source in the process. Heat for heating purposes is gained from the exhaust gases, with at least about half of the water contained in the exhaust gases being condensed out.

A plant for carrying out the method includes a stack of fuel cells, a burner, at least one heat exchanger and a consumer system.

It is advantageous for the named stack of fuel cells to comprise a stack of planar cells which is arranged in a heat insulating sleeve, with a channelling system by means of which the input air is preheated being contained in the sleeve. A prereformer is placed ahead of the stack, which is executed in a centrally symmetric manner for example, in which the hydrocarbons, in particular methane, are converted to carbon monoxide and hydrogen in the presence of water and with the absorption of heat. The fuel cells must be operated with a relatively large air surplus in order that no detrimental temperature gradients arise. The stoichiometric ratio must be greater than about 3; i.e. in the case that the combustion gas contains methane, at least about 6 moles of oxygen instead of 2 moles must be made available per mole of methane for converting the methane into carbon monoxide and water.

Also, in order to have available as large an amount of heat for heating purposes as possible, at least half of the copiously arising water vapor is condensed out in accordance with the invention during the heat extraction from the exhaust gases of the burner and the battery in such a manner that the heat of condensation is exploited. Since the exhaust gas of the battery contains a considerable percentage of oxygen, this can be used during the combustion in the burner. Here, it is important for the invention that the water vapor contained in this exhaust gas also appears as a constituent of the burner exhaust gas and thus continues to be available for use in heating.

BRIEF DESCRIPTION OF THE DRAWINGS

FIG. 4 is a schematic diagram of the plant of FIG. 2, FIGS. 5, 6 show schematic diagrams of each of two further plants in accordance with the invention, and FIG. 7 is a schematic diagram of a plant with a lambda probe.

DESCRIPTION OF THE PREFERRED EXEMPLARY EMBODIMENTS

Figure 1:
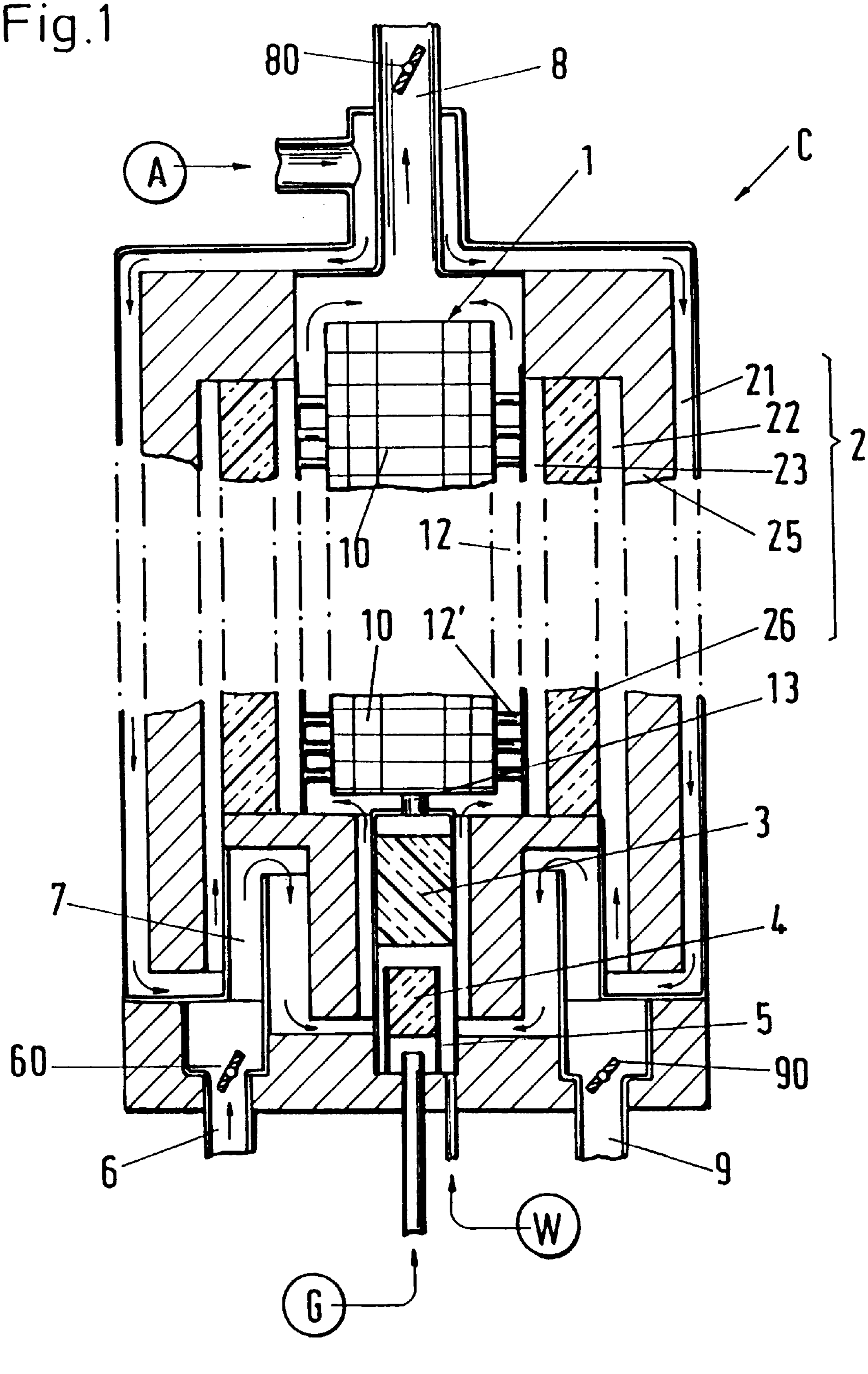
FIG. 1 is a stack of fuel cells.

The stack of fuel cells C in FIG. 1 is to be understood as an example. A different example is described in the European patent application No. 96810410.9 (P.6739). Further details are also disclosed there which are not dealt with here.

The battery C comprises a stack 1 of substantially centrally symmetrical high temperature fuel cells 10, a prereformer 3, a sulphur absorber 4 and a sleeve 2. A first channelling system of the sleeve 2 has the following parts: ring-gap-like chambers 21, 22 as well as 23, an air-impermeable body 25 of a heat insulating material and an air-permeable body 26 which enables a radial air inflow from the chamber 22 into the chamber 23. Air can be fed in from the chamber 23 through an afterburner chamber 12 into the cells 10 via tubelets 12'. A second channelling system 7 in the lower part of the battery C represents a heat exchanger by means of which heat can be supplied to the prereformer 3 and the sulphur absorber 4. A ring-gap-like jacket chamber 5 about the sulphur absorber 4 is executed as a vaporizer for water W.

The combustion gas G required for the current yielding reactions is fed in centrally into the cell stack 1 via the absorber 4, the prereformer R and a line 13.

During a start up phase, a hot combustion gas is fed through a tube 6 into the battery C in order to heat up the latter. After flowing through the second channelling system 7 and the afterburner chamber 12, the combustion gas leaves the battery C through a tube 8. After being heated up, the battery C can be brought into a current-delivering operating state. During this operating state, hot exhaust gas flows out of the afterburner chamber 12 in the opposite direction through the second channelling system 7 to an outlet 9, whereupon the exhaust gas yields up the heat required in the prereformer 3 and the vaporizer 5. The flow of the hot combustion gas or of the exhaust gas respectively is controlled by the blocking members (flaps) 60, 80 and 90.

Figure 2:
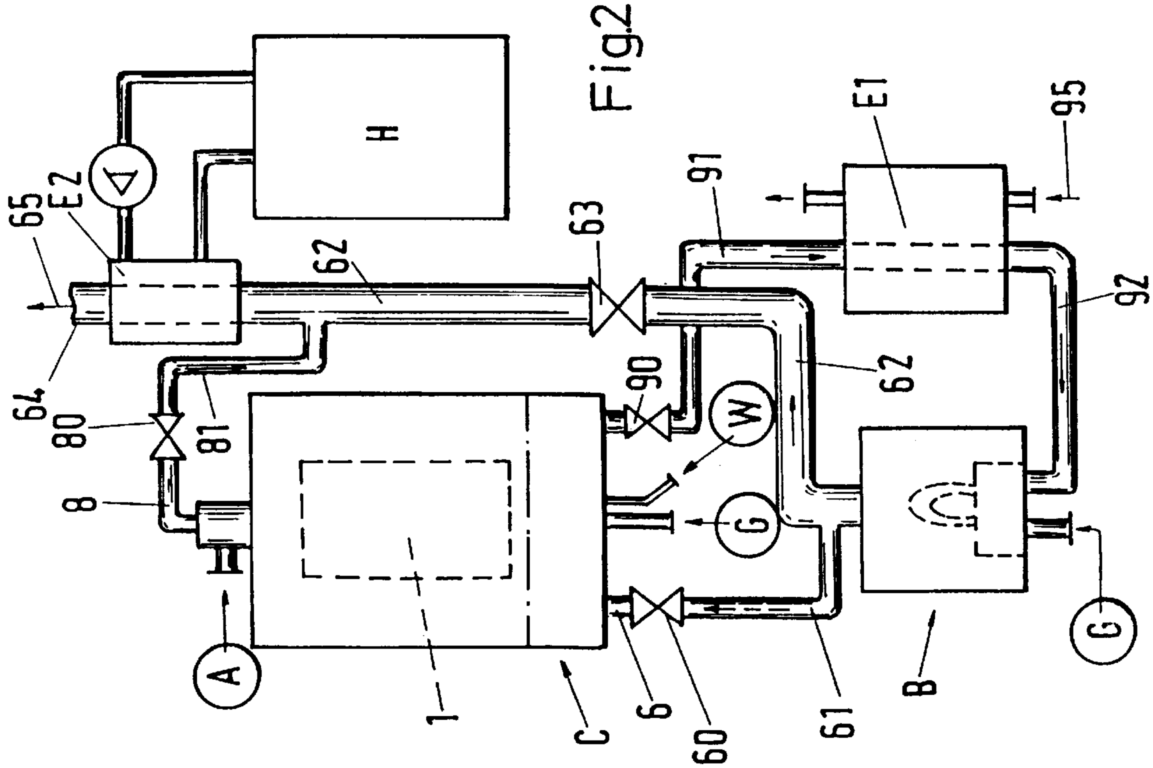
FIG. 2 is a plant by means of which the method in accordance with the invention can be carried out.

In the plant in accordance with the invention of FIG. 2 the battery C is combined with a gas burner B in a special manner. During the current-delivering operating state the exhaust gas of the battery C is led via a line 91 into a first heat exchanger E1, for example a heater for utility water 95, and subsequently—line 92—fed into the burner B, where the oxygen contained in the exhaust gas is used for the combustion of the gas G. (In a utility water heating it is advantageous to use a storage, namely a boiler, in which fresh water flows into the bottom of the boiler as heated water is removed. The heating and the removal of the water are carried out here in a known manner such that a lower cold zone coexists with an upper warn zone.) The combustion gas of the burner B—line 62—is conducted through a second heat exchanger E2 and the heat won there is used for a room heating H. It is envisaged in accordance with the invention that water vapor of the combustion gas is condensed out in the heat exchanger E2. The cooled combustion gas 65 is conveyed via a line 64 to a non-illustrated chimney.

For the heating up during the starting phase, the combustion gas, which can be produced by the burner B, can be supplied via the line 61 to the battery C—with open blocking members 60 and 80 as well as with closed blocking members 63 and 90. The cooled combustion gas enters the line 62 leading to the heat exchanger E2 via the line 81. If the burner B is used for heating the battery C, air must be taken directly from the surroundings (not shown in FIG. 2).

Figure 3:
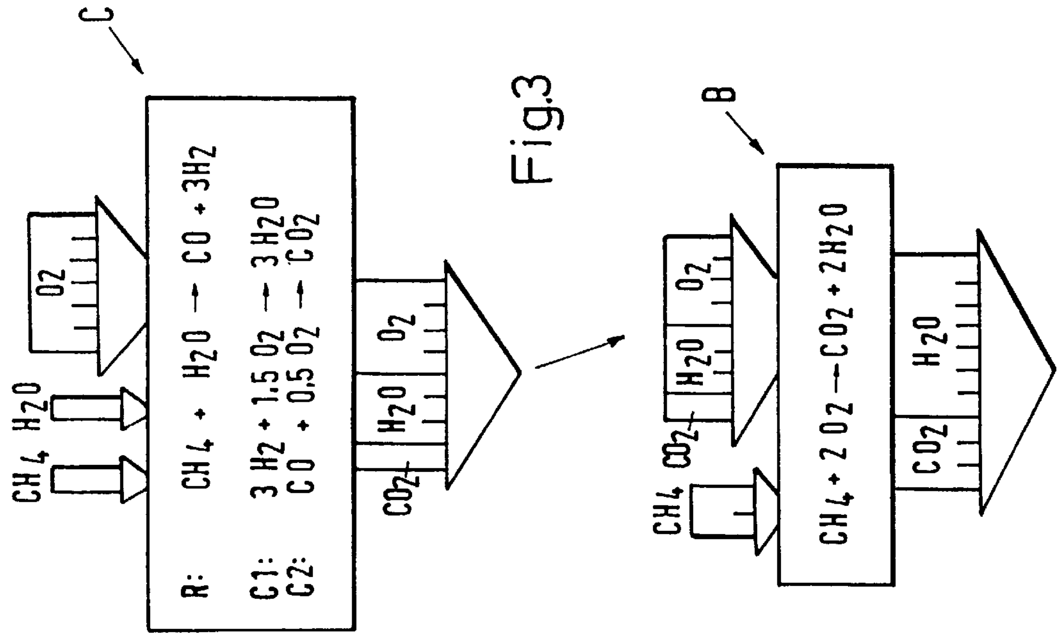
FIG. 3 shows illustrations of the reactions taking place in the battery and in the gas burner.

In the upper half of FIG. 3 it is shown that the educts methane, water and oxygen are converted in the battery C via the reactions R, C1 and C2 into the products carbon dioxide and water, which leave the battery with the exhaust gas. In the present example, oxygen is fed in in the threefold amount with respect to the stoichiometric requirement. The unused portion of the oxygen also appears in FIG. 3 as part of the exhaust gas.

The reaction R, namely a reforming, converts methane into the electrochemically utilizable intermediary products hydrogen and carbon monoxide. A corresponding reforming is also possible if other hydrocarbons are used. The reactions C1 and C2 are those electrochemical reactions as a result of which the electrical energy is generated. Together with the oxygen, further constituents of the air (nitrogen) flow through the battery, which are not shown in FIG. 3 for the sake of clarity.

The lower half of FIG. 3 shows a combustion taking place in the burner B, namely the combustion of methane using the exhaust gas of the battery C in accordance with the method of the plant shown in FIG. 2. The combustion gas produced contains 7 parts of $H_2O$ for 3 parts of $CO_2$, with 1 part of $CO_2$ and 3 parts of $H_2O$ having already been supplied to the burner B in the exhaust gas of the battery C. On the basis of FIG. 3 it becomes evident that water vapor is an essential component of the exhaust gases. The method in accordance with the invention is particularly advantageous since the water vapor contained in the battery exhaust gas appears as a constituent of the burner exhaust gas and is thus also available for use in heating.

The schematic diagrams of FIGS. 4 to 6 show three examples for plants in accordance with the invention in which a battery C, a burner B and one or two heat exchangers E or E1 and E2 respectively are combined. A first exhaust gas is formed in the battery C, a second exhaust gas in the burner B.

The combination of FIG. 4 corresponds to the plant of FIG. 2. The supply of the means air A, gas G and water W is symbolized in a simplified manner by the arrow 100, with these means in reality being fed into the battery B at different locations. The connections 910 and 920 correspond to the lines 91 and 92 respectively in FIG. 2. The dashed arrow 930 indicates that the first exhaust gas need not be conducted to the burner B in its entirety. If the air surplus in the battery C is large, it is advantageous if only a part of the first exhaust gas is used in the burner B. The arrow 650 corresponds to the arrow 65 in FIG. 2 and represents the flow of exhaust gas to a chimney. In the first heat exchanger it is advantageous not to perform a condensation of the water vapor. The condensation proceeds from the second exhaust gas in the heat exchanger E2.

FIG. 5 shows substantially the same circuit as in FIG. 4. The difference is that the first exhaust gas is conveyed via the connection 900 directly into the burner B without a removal of heat taking place in a first heat exchanger. The heat utilization in accordance with the invention takes place in the single heat exchanger E.

In the plant of FIG. 6 the exhaust gases of the battery and the burner are conducted to the single heat exchanger E as a mixture. A part of the cooled exhaust gas is conveyed back into the burner B via the connection 950. The connection 600 in dashed lines indicates that the combustion gas of the burner can be used for heating up the battery (start up phase).

FIG. 7 shows a schematic diagram of a plant with a lambda probe D1 which is placed after the burner and by means of which the oxygen content of the exhaust gas can be measured. This probe is a component of a control system which regulates by means of a logic circuit D the supply of the combustion gas (control member D2) and/or of the exhaust gas of the fuel cells (control member D3) into the burner. If natural gas is used, it is advantageous for the control system to ensure that at least 2.2 moles of molecular oxygen per mole of methane are fed into the burner B.

The first exhaust gas, i.e. the exhaust gas that arises in the battery of fuel cells, has a relatively low dew point (condensation temperature of the water vapor). At a stoichiometric ratio of 5 for the air surplus and at an efficiency of 50% for the electrical energy, the dew point lies at 42° C. Corresponding pairs of figures for the air surplus/dew point are: 3.63/48.3° C. and 10/31.0° C. For a return flow temperature of a heating system, which typically amounts to 30° C., only little heat can be won by water condensation in a heat exchanger which is placed after the stack of fuel cells.

Thanks to the method in accordance with the invention, the water vapor contained in the first exhaust gas appears in the second exhaust gas—the exhaust gas of the burner—at a higher dew point. The elevation of the dew point amounts to several degrees Celsius and it holds that: the greater the air surplus in the battery, the greater this elevation is. In accordance with the higher dew point, more heat is obtained through condensation with the return flow of the named heating system.

Compared with a method in which air is taken directly from the surroundings as an oxygen source for the burner, there results an improvement of the total efficiency (=ratio of heat energy plus electrical energy won to the energy content of the combustion gas) of several percent. At an air surplus of 7 for the battery and 1.5 for the burner, at a utilisation of 20% of the combustion gas in the battery and 80% in the burner, at an electrical efficiency of 50%, further at a heating of the return flow from 30 to 40° C. in the heat exchangers E2 (first) and E1 in accordance with the exemplary embodiment of FIG. 4, there results an increase in the total efficiency of about 6%. The dew point of the second exhaust gas amounts to 55.8° C. in this example, whereas it amounts to only 35.1° C. for the first exhaust gas. The heat won through condensation amounts to about 8% of the total usable energy.

What is claimed is:

1. A method for the simultaneous generation of electrical energy and heat for heating purposes from a combustion gas comprised of one or more hydrocarbons as well as a gas mixture containing oxygen, by means of at least one gas burner and at least one stack of fuel cells, with an oxygen surplus having a stoichiometric ratio greater than approximately 3 with respect to the hydrocarbons being provided in the stack of fuel cells the method comprising, converting less than half of the combustion gas in the stack for the generation of electricity while producing a first exhaust gas; burning the remaining part of the combustion gas in the burner while producing a second exhaust gas; using the first exhaust gas at least partially as an oxygen source for the combustion; and gaining heat energy from the exhaust gases, with at least approximately half of the water contained in the exhaust gases being condensed out; wherein the two exhaust gases are mixed directly upon their leaving the stack of fuel cells and the burner respectively, the exhaust gas mixture being conducted into a heat exchanger in which heat for heating purposes is removed from the mixture while water vapor is condensed; and wherein subsequently a portion of the cooled mixture is conducted back to the burner for the combustion.

2. A method in accordance with claim 1 wherein the combustion gas comprises methane; wherein the gas mixture containing the oxygen is air; and wherein at least approximately 6 moles of molecular oxygen as well as 1 mole of water are fed in to the stack of fuel cells per mole of methane.

3. A method in accordance with claim 2 wherein at least 2.2 moles of molecular oxygen per mole of methane are fed in to the burner.

4. A method in accordance with claim 1 wherein at least a portion of the first exhaust gas is supplied to the burner without prior removal of heat.

5. A method in accordance with claim 1 wherein the first exhaust gas from the stack of fuel cells is conducted into a heat exchanger in which heat for heating purposes is removed from the exhaust gas.

6. A method in accordance with claim 1 wherein combustion gas of the burner is used for the heating of the fuel cells to operating temperature during a start up phase.

7. A plant comprising a stack of fuel cells, a burner, at least one heat exchanger for exhaust gases which arise in at least one of the burner, the stack of fuel cells, and at least one consumer system for the utilization of the heat gained from the exhaust gases, with a connection being provided from the stack of fuel cells to the burner for the exhaust gas, wherein less than half of combustion gas supplied to the stack of fuel cells is converted in the stack of fuel cells and the remaining portion of the combustion gas is burned in the burner; wherein the plant is configured such that the exhaust gases are mixed directly upon their leaving the stack of fuel cells and the burner respectively, the exhaust gas mixture being conducted into a heat exchanger in which heat for heating purposes is removed from the mixture while water vapor is condensed; and wherein the plant is configured such that subsequently a portion of the cooled mixture is conducted back to the burner for the combustion.

8. A plant in accordance with claim 7 wherein the consumer system comprises a utility water heater and a room heating system.

9. A plant in accordance with claim 8 wherein the utility water heater stands in active contact with an exhaust gas line of the stack of fuel cells.

10. A plant in accordance with claim 7 wherein a lambda probe is provided at the output of the burner for determining the oxygen content of the exhaust gas; and wherein the probe is a component of a control system by means of which supply of the combustion gas and/or of the exhaust gas from the fuel cells into the burner is regulated.

11. A plant in accordance with claim 7 wherein the stack of fuel cells contains a channelling system for heating up the stack of fuel cells during a start up phase; and wherein the channelling system can be connected to the exhaust gas line of the burner.

12. A plant in accordance with claim 7 wherein the stack of fuel cells comprises a centrally symmetrical cell stack as well as a prereformer placed ahead of the stack for the combustion gas.

13. A plant in accordance with claim 7 wherein the connection for the exhaust gas is a direct connection.

14. A plant in accordance with claim 7 wherein the connection for the exhaust gas is an indirect connection.

* * * * *